March 7, 1950

W. A. AYRES 2,499,349

OBSTACLE AVOIDANCE SYSTEM

Filed March 31, 1943

INVENTOR
WALDEMAR A. AYRES
BY
Paul B. Hunter
his ATTORNEY.

March 7, 1950     W. A. AYRES     2,499,349
OBSTACLE AVOIDANCE SYSTEM
Filed March 31, 1943     2 Sheets-Sheet 2
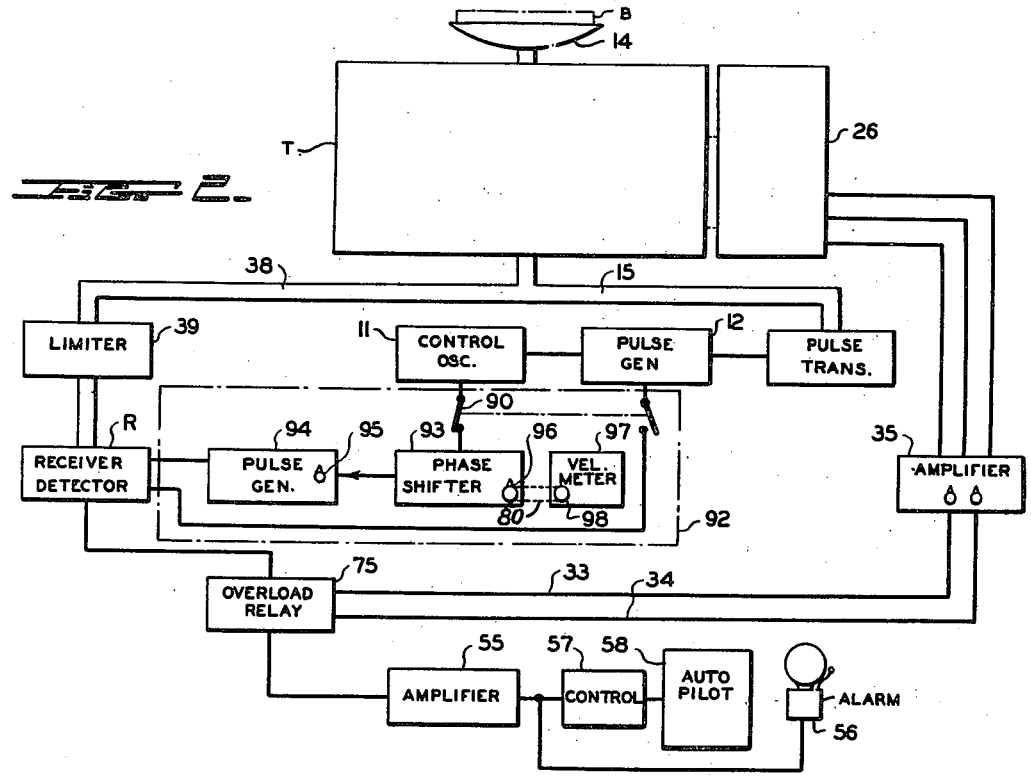
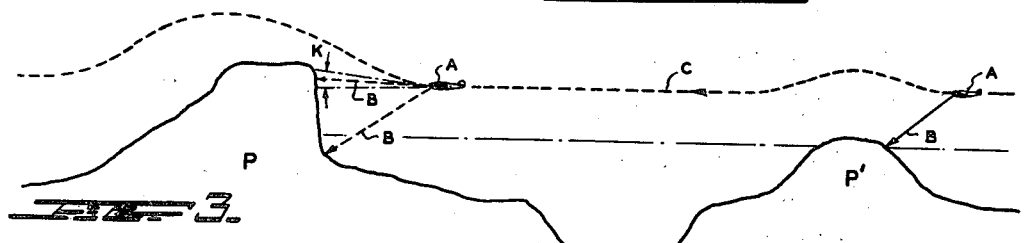
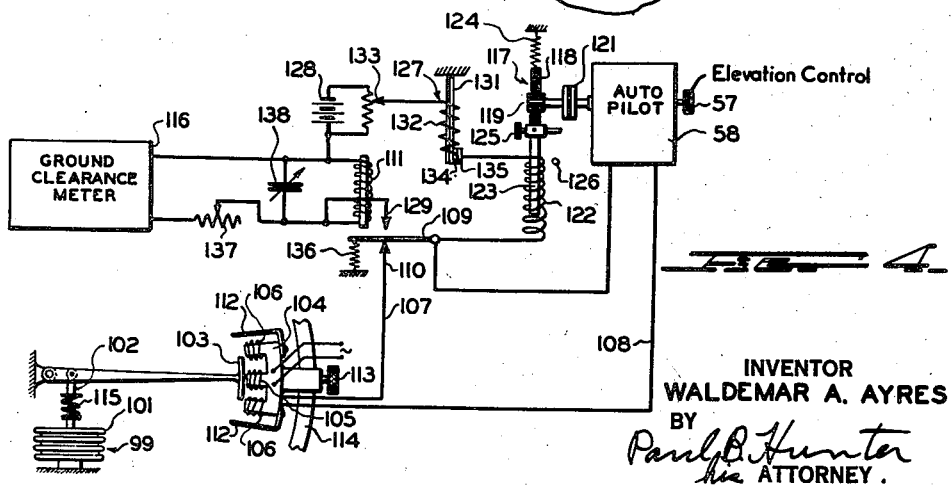
INVENTOR
WALDEMAR A. AYRES
BY
his ATTORNEY.

Patented Mar. 7, 1950

2,499,349

UNITED STATES PATENT OFFICE 2,499,349

OBSTACLE AVOIDANCE SYSTEM

Waldemar A. Ayres, Kew Gardens Hills, N. Y., assignor to The Sperry Corporation, a corporation of Delaware Application March 31, 1943, Serial No. 481,370

11 Claims. (Cl. 343—7)

This invention relates to navigation and vehicle control systems, and, more especially, to methods of and apparatus for avoiding obstacles lying in the path of a moving vehicle.

The present system is applicable generally to all types of vehicles to which obstacle avoidance presents a problem. Thus, for example, the system is applicable to sea-going vessels whose travel along a prescribed course may present collision hazards when the view ahead is obstructed by darkness, fog, or other adverse weather conditions. By means of the present invention the presence of an obstacle in the path of the vessel may be detected, and the motion of the vessel may be corrected so as to avoid the obstacle. In the case of a vessel, this may be accomplished by diverting the vessel from its course, or by gradually reducing the speed. The same principles may be applied to land vehicles, and particularly to trains whose safe progress along the rails is continually threatened by the danger of collision with another train going in the same direction or with objects such as stalled automobiles or cows on the tracks. Under these circumstances, the present system may be utilized to detect the presence of the object and to apply a braking element so as to reduce the train speed in time to avoid striking the obstacle.

Although the system is applicable generally to all types of dirigible craft, the invention is described herein specifically as applied to the control of an aircraft, such as an airplane or lighter-than-air craft. Under these circumstances, the present invention is useful in detecting an obstacle lying along the aircraft course, determining when the obstacle becomes close enough as to constitute a hazard, and controlling the aircraft motion, as by diverting it from its course or altering its speed, so as to avoid the obstacle. As applied to aircraft, the system is useful also in determining minimum ground clearance conditions and applying similar control measures. Although the principles of the invention herein are described specifically as applied to aircraft, it will be understood that the principles may be applied equally well to other types of craft.

The principal objects of the present invention are: to provide an improved obstacle avoidance system; to provide a system of aerial or marine navigation wherein obstacles may be detected along the established course, and to provide in such a system means for and methods of avoiding such obstacles; to provide vehicle control means responsive to electromagnetic wave reflections from an obstacle lying in the path of a moving vehicle for maneuvering the craft or regulating its speed so as to avoid the obstacle; to provide an obstacle avoidance system that may be combined with a conventional electromagnetic wave object detecting system of the type forming images of objects in response to reflections of electromagnetic energy from the object; to provide an aircraft navigation system adapted to control the flight of an aircraft barometrically, with provision for upward diversion when the clearance between the terrain and the course of the aircraft reaches a predetermined minimum; to provide a system for diverting a vehicle from its course when an obstacle is indicated to be lying along its path, and to continue diversion of the craft for a predetermined time interval following actuation of the device; and to provide an obstacle avoidance system wherein the motion correction means is responsive only to obstacles within prescribed distance limits of the moving craft, and wherein the limits may be controlled as a function of the vehicle's speed. These and other objects will become more fully apparent from the following description and the accompanying drawings illustrating several embodiments incorporating principles of the invention.

In the drawings,

Fig. 2 is a schematic and block diagram of an apparatus similar to that shown in Fig. 1, but wherein certain parts and arrangements have been simplified.

Fig. 3 is a diagrammatic view of an aircraft flying over an irregular terrain, the proportions of the terrain having been exaggerated to better illustrate the principles of the invention.

Fig. 4 is a schematic and wiring diagram of a portion of the vehicle control system.

Figure 1:
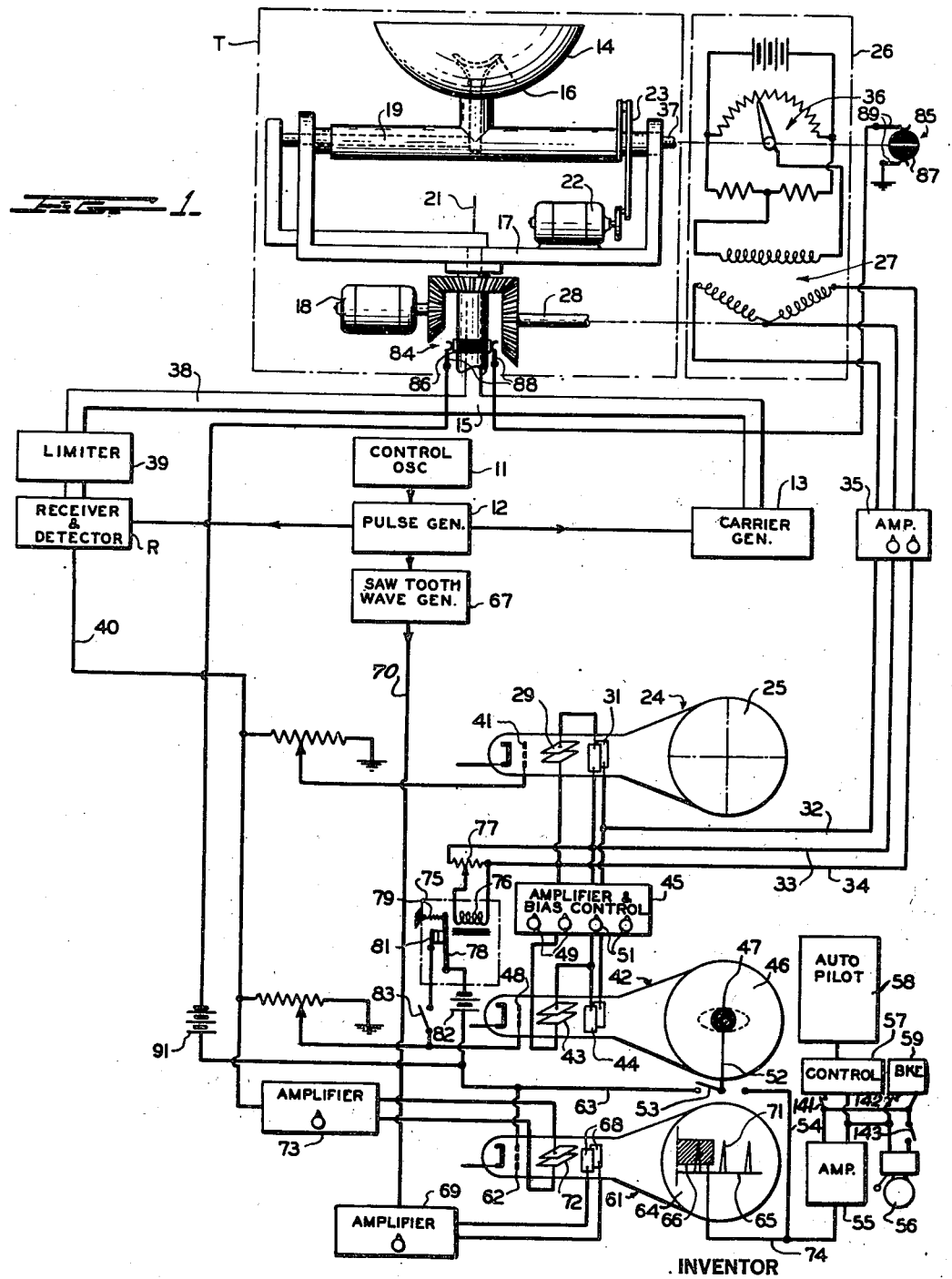
Fig. 1 is a schematic and block diagram of an electromagnetic wave radiator and receiver, with craft controlling means responsive to signals derived from reflected pulses.

Generally speaking, the invention comprehends projecting electromagnetic energy in a zone lying forwardly of a moving vehicle, and deriving vehicle control signals from energy reflections propagated by obstacles lying within such zone. The motion of the craft is controlled by those signals designating an obstacle lying in at least a portion of said zone, so as to divert the vehicle or arrest its motion to avoid the obstacle. The electromagnetic energy may be directed at an angle downwardly and forwardly of the aircraft at periodic intervals so as to provide control signals when the terrain clearance reaches a predetermined minimum, whereby the craft may be diverted upwardly to increase the clearance. The system may include a barometric altitude control which normally controls the aircraft flight, but which may be temporarily superseded by a minimum terrain clearance control. The system may be rendered sensitive to only those objects lying within predetermined distance limits relative to the moving vehicle, and the distance limits may be coordinated with the vehicle speed.

With particular reference to Fig. 1, one embodiment of the invention may comprise an electromagnetic pulse transmitter T and receiver R mounted on the vehicle such as an aircraft A. The transmitter T may comprise a control oscillator 11 adapted to regulate the frequency of a pulse generator 12 which provides brief pulses for controlling a carrier wave generator 13 so as to form periodic brief pulses of electromagnetic energy to be radiated from a radiator 14. The receiver R, which normally is biased to an inoperative condition, is rendered momentarily operative periodically by pulses from the generator 12. An electromagnetic pulse system is preferred to a continuous wave system because it permits an easier determination of the time interval between the transmission of energy and the reception of energy reflected from an irradiated obstacle. The pulses are conducted from the generator 13 to the radiator 14 in any suitable manner, but when utilizing wavelengths of the order of 10 centimeters, such conducting means preferably comprises a wave guide or other similar conductor 15. The radiator 14 preferably comprises a parabolic reflector through which the wave guide 15 projects axially so as to discharge against a deflector 16, adapted to distribute the energy over the concave surface of the reflector and to provide better collimation of the electromagnetic energy. The energy is propagated as a beam B in the direction of the radiator axis, which is preferably maintained horizontal.

The beam may be controlled so as to irradiate successive portions of a zone e. g., a zone lying forwardly of the vehicle on which the transmitter is disposed. Although any type of motion may be employed such that each portion of the zone is successively irradiated, Fig. 1 discloses spiral-conical scanning mechanism because of the relative ease with which this motion is obtainable. Such a motion is obtained by rotating the radiator 14 initially about its axis while gradually nodding the radiator about a transverse axis so that the beam describes the surface of revolution of a cone of successively increasing and decreasing vertex angle as the nod angle increases and decreases. Although this action might be obtained electronically, a simple mechanical arrangement has been shown in the drawings for simplicity of illustration. In Fig. 1 a yoke-like radiator support 17 is adapted to be rotated rapidly about a central axis 21 by a motor 18. The radiator 14 may be nodded about a transverse axis 19 as by means of a second motor 22 and link mechanism 23, rotatable with support 17 and adapted to provide regular but relatively slow reciprocation of the radiator, combining with the motion about axis 21 to provide the desired conical scanning.

Transmitters T ordinarily are employed at fixed or movable stations as part of a complete apparatus for forming images of irradiated objects. Accordingly, such a transmitter T ordinarily is accompanied by a receiver R and a picture tube 24 on the screen 25 of which an image is formed of the irradiated object or objects, usually by momentarily brightening the cathode ray trace of the picture tube when the trace impinges on a point of the screen corresponding to the position of the objects. The picture tube 24 ordinarily is operated by sweeping the cathode ray about the screen 25 in a path corresponding to the path followed by the beam of electromagnetic energy.

Fig. 1 discloses a simple means by which the motions of the cathode ray and the electromagnetic beam may be synchronized. A cathode ray sweep circuit 26 comprises a two-phase generator 27 operated as by connection 28 in synchronism with the rotation of support 17 to produce a circular trace on the screen 25, as by applying the output voltage of the two-phase generator 27 to the vertical and horizontal deflection plates 29 and 31, respectively, through wires 32, 33 and 34. Each phase may be separately amplified and adjusted as by means of amplifier 35 to produce balanced conditions. The radius of the circular sweep is determined by the amplitude of the voltage from the generator 27 applied to the plates 29 and 31, which voltage may be varied in synchronism with the nod action of the radiator 14 by varying the generator voltage in coordination with the nod motion. A simple potentiometer device 36 operated as by connection 37 may be used for this purpose to vary the excitation of generator 27. With such an arrangement the instantaneous position of the trace on the screen 25 corresponds with the instantaneous position of the beam, and indicates the position of a reflecting object as it would appear to an observer sighting along the axis 21.

Since the images may be formed on the screen 25 by momentary brightening of the cathode ray, a suitable control is provided to condition the tube 24 at the instant a reflection is received from an irradiated object. As shown in Fig. 1, use may be made of a receiver and detector R connected with the radiator 14 as by means of a wave guide 38, which may join with the wave guide 15 as shown. A limiter 39 may be interposed between the radiator 14 and the receiver R to protect the latter, which limiter provides a high impedance to strong pulses and a low impedance to weak pulses. The limiter may comprise a gas discharge device that may be ionized by a strong signal so as to provide a low impedance path within the limiter, while setting up a high impedance region at the point of intersection of the wave guide 38 with the wave guide 15, as by proper selection of the length of guide 38. Relatively weak signals, such as are received by the radiator 14 and conducted through the guide 38, pass through the limiter 39 with relatively small attenuation, while pulses directly from the carrier generator are impeded. The receiver R applies a conditioning pulse or signal along wire 40 to the tube 24 as by providing a suitable bias to the control grid 41.

An obstacle avoidance system comprehended by the present invention may be combined readily with the foregoing apparatus, as illustrated in Fig. 1. A signal device 42 of any convenient form may be used to derive a motion-corrective signal from reflections detected in the receiver R. The device 42 may comprise a cathode ray tube having vertical and horizontal deflecting plates 43 and 44, connected to the wires 32, 33 and 34, respectively, so that the trace is coordinated with the trace of tube 24. An amplifier 45 may be provided as shown to magnify the circular sweep action and effectively vary the portion of the irradiated zone visible on the screen 46. A target 47 comprises a conductive electrode preferably centrally disposed on the inside face of the screen 46 in the path of the electron stream. The tube 42 is keyed by signals detected in the reciever R, and applied to control grid 48 in a manner to control the flow of electrons within the tube 42.

The target 47 designates a portion of the irradiated zone in which obstacles are deemed to be a hazard to the continued flight of the aircraft along its course C. The target 47 ordinarily is symmetrically disposed on the screen 46 and in conjunction with the electron source designates a narrow conical portion K (Fig. 3) lying along the aircraft course within the irradiated zone which portion might be termed "a cone of danger." The slenderness of this cone, related back to the corresponding cone defined by the beam in space, may be regulated by adjusting the controls 49 on amplifier 45. The shape of the electrode 47 in conjunction with the setting of controls 49 determines the cross-sectional shape of the cone of danger. Thus, if equal voltages are applied to the plates 43 and 44, and electrode 47 is round, the cone will be circular; by providing different amplitudes on the respective sets of plates 43 and 44, as by adjusting the controls 49, the effective shape of the electrode may be distorted to that indicated in broken lines on the screen 46.

The electrode 47 may be effectively shifted relative to the neutral point of impingement of the cathode ray by means of bias controllers 51 on the amplifier 45, each of which varies the bias on one set of plates to assist in centering the electron stream for normal operation. By providing horizontal bias, the cone of danger may be effectively tilted horizontally, to aim to the right or left of the plane, so as to correct for cross winds in establishing the true path of travel. A bias applied to the vertical plates tilts the cone of danger upwardly or downwardly such as may be desirable when deriving reflections from the ground.

The impingement of the electron stream on the target 47 produces a current flow through wire 52 which may be utilized to operate a suitable motion correction device for the vehicle, or to operate a suitable alarm enabling the vehicle motion to be corrected manually. As shown in Fig. 1, the signal from electrode 47 may be conducted through wire 52, switch 53 with the blade in the right-hand position, and wire 54 to amplifier 55, the latter amplifying the signal until it has appreciable power. A bell, light, or other alarm 56 is energized by the amplifier and preferably is permanently connected in the circuit to warn the pilot or other operator of impending danger, even though additional provision is made for automatic correction of the vehicle motion. The output of the amplifier 55 also preferably connects with a steering control element 57 of a conventional automatic navigation or steering device, such as an automatic pilot 58.

The nature of the control exercised depends principally upon the type of vehicle with which the system is employed. With aircraft, it may be desirable to control the elevation control of the automatic pilot, in turn control, or both. The automatic pilot 58 and control 57 may be of the general type shown in B. G. Carlson Patent No. 2,203,671, issued June 11, 1940. The manner in which the present system may be connected to such an automatic pilot is herein more fully described in connection with Fig. 4.

Use may be made of any suitable type of control that will divert the craft or vehicle from its path of travel when signals from target 47 indicate that some reflecting object is located within the cone of danger. With some vehicles, for example, railroad trains, the motion correcting device may logically take the form of a mechanism for decreasing the speed of the vehicle. A brake 59 has been shown diagrammatically in Fig. 1 connected with the output of amplifier 55 so that it may operate as an alternative to the automatic pilot or in conjunction with it. In the case of dirigible automotive vehicles it may be desirable to steer the vehicle off its course, to reduce the vehicle's speed, or both. Likewise, with an aircraft the warning signal may operate a steering device to divert the craft from its course or to reduce the flying speed, or both. In the case of aircraft, the braking device 59 may comprise mechanism for operating the usual wing flaps on fixed wing airplanes, or the propeller pitch controller on lighter-than-air craft. With marine vehicles, similar control of the direction of movement and of the forward speed may be obtained by proper control of the rudder means and propellers. As shown in Fig. 1, suitable switches 141, 142 and 143 connecting steering control mechanism 57, speed control device 59 and alarm 56, respectively, or other control means may be employed to preselect the desired type of utilization apparatus to be actuated by a warning signal.

It may be desirable to disregard signals derived from reflections propagated by objects located at safe distances from the vehicle, even though such objects lie within the "cone of danger." Thus, it may be desirable to have the motion corrective system respond to objects within a predetermined minimum range.

One such form of minimum range device comprises a cathode ray tube 61 having a control grid 62 keyed into an operative condition in response to a signal from target 47 flowing through wire 52, switch 53 when the blade is in the left-hand position, and wire 63. The cathode ray within tube 61 is swept horizontally as a function of time along the screen 64 to form a trace 65 thereon, which may be deflected so as to impinge upon a target or electrode 66 located so as to designate desired distance limits for reflecting objects. The trace 65 is formed by applying a sawtooth wave voltage from a generator 67 to the horizontal deflecting plates 68 in synchronism with the generation of pulses to the radiator 14, as by controlling the wave generator 67 by the pulse generator 12. An adjustable amplifier 69 may operate on the sawtooth waves conducted over wire 70 from the generator 67 to provide suitable control of the horizontal deflection, and, likewise, of the extent of the minimum range designated by the target 66.

The trace 65 normally is biased so as to follow a path beneath the target 66, but the trace may be made to overlap the target by forming one or more pips 71 in response to the detected reflections. As shown in Fig. 1, the pips 71 may comprise brief vertical deflections of the trace 65 produced by applying momentary pulses from the receiver R to the vertical deflecting plates 72 at the instant each reflection is received. An amplifier 73 may be disposed between the receiver R and the plates 72 to provide suitable control of the vertical deflection.

In operation, the trace progresses toward the right along a horizontal path during a period following the transmission of each electromagnetic pulse into space. A reflection from an object in the path of the beam produces a pip 71 in the trace 65 at a distance from the left-hand origin of the trace corresponding to the distance of the reflecting object from the radiator 14. If the time interval between the radiation of a signal and the detection of a reflection is sufficiently short, designating a range of objects considered dangerously close, the pips 71 will overlap the target 66 causing a momentary impingement of the cathode ray thereon and producing a signal which may be conducted to the amplifier 55 along wire 74 to produce the desired correction.

It will be apparent that the tubes 42 and 61 comprise essentially two series-connected switches, both of which must be closed to produce a warning signal or a corrective motion. With the switch 53 in the left position, as shown in Fig. 1, if an object is located within the cone of danger and is sufficiently close to the vehicle, the conditions necessary for the operation of tubes 42 and 61 are satisfied, and a reflction from such an object causes electrical energy to flow through both wires 52 and 74 so as to produce a proper response.

Under ordinary operating conditions with the cathode ray normally symmetrically disposed within the tube 42, the target 47 detects objects within a narrow cone extending along the axis 21. When the beam is projected within this cone periodically, the potentiometric device 36 is disposed so as to produce a small amplitude or voltage within the generator 27. Use may be made of this fact to simplify the control mechanism when a check is made on the object distance, as by using a tube 61. When the latter tube is used, the switch corresponding to tube 42 may be closed each time the electromagnetic beam is confined within the cone of danger, since no signals can operate on amplifier 55 unless objects are actually present to form the pips 71 in tube 61.

Accordingly, the cathode ray tube 42 may be replaced by a simple overload relay 75, comprising a coil 76 operable by one phase of the output from generator 27, for example, as obtained from wires 33 and 34. The sensitivity of the coils 76 may be varied by means of a voltage adjustor 77. An armature 78 is urged by spring 79 into engagement with a fixed contact 81 at all times when the current flowing through coil 76 falls below a predetermined minimum, such as during the period that the nod angle of radiator 14 is small. The relay 75 may be utilized to key the tube 61 intermittently by applying a proper biasing voltage from battery 82 to the control grid 62 when switch 83 is closed, and switch 53 is opened. Accordingly, each time the electromagnetic beam sweeps about a cone of revolution within the cone of danger, the circuit through relay 75 is closed, and the tube 61 is conditioned so that any objects lying within the proper range may produce a signal from target 66.

With the controls 51 adjusted so that the cathode ray is normally centered within the tube 42, the cone of danger K extends forwardly of the aircraft as indicated in Fig. 3, symmetrically disposed relative to the axis 21. As previously pointed out, the cone of danger may be deflected from this position by applying a biasing voltage to the plates 43 or 44 until the beam is deflected the desired amount vertically or horizontally from the axis of the tube 42. By applying a suitable bias voltage to the plates 43, the cone of danger may be directed diagonally downward from the full forward position, whereby the beam may irradiate the terrain below and forward of the airplane. Reflections forming signals that impinge on the target 66 accordingly may indicate that there is insufficient clearance between the approaching terrain and the aircraft, so that operation of the alarm 56 may notify the pilot to increase elevation, or this operation may be performed automatically by applying a suitable signal voltage to the elevation control 57 of the automatic pilot 58.

With the cone of danger distorted permanently downward, it no longer can perform its originally described function, that is, to detect obstacles lying along the path of travel of the vehicle. If desired, the bias voltage regulated by controls 51 may be commutated intermittently so that the cone of danger alternately operates to detect obstacles along the path of travel, and as a minimum terrain clearance meter, in conjunction with tube 61. Preferably, however, commutators 84 and 85 are provided for conditioning the tube 61 independently of tube 42 when the beam from the radiator 14 is disposed at a predetermined angle forwardly and downwardly of the aircraft, suitable for terrain clearance measurement.

Since each angular position of the radiant energy beam corresponds to an instantaneous position of the radiator 14 about axes 19 and 21, the tube 61 may be conditioned for operation when the beam is in the desired position by locating commutators 84 and 85 properly on members rotating about the axes 19 and 21. As diagrammatically shown in Fig. 1, each commutator may comprise rotatably adjustable discs 86 and 87 of insulating material having a conductive segment adapted to complete the connection between respective contactors 88 and 89 for a brief interval during each cycle of rotation. With the commutators 84 and 85 each adjusted to complete the circuit when the beam is disposed at the desired angle forwardly of the aircraft, e. g., at 45° to the horizontal, the arrangement may be used to derive signals from ground reflections by connecting both commutators in a series circuit with a battery or other biasing source 91, so as to key the tube 61 into an operative condition whenever the beam is in the desired position.

The operation of the device disclosed in Fig. 1 is perhaps manifest from the foregoing detailed description, but may be summarized as follows. Pulses of electromagnetic energy are radiated into successive portions of a zone lying forwardly of the craft. These pulses each may have a duration of the order of one microsecond, and the pulses may be formed and propagated at the rate of approximately 2,000 per second. Objects located within the irradiated zone produce reflections that may control the formation of images of the objects as luminous points, properly oriented on the screen 25 of the observation tube 24. Reflections formed by objects located within the cone of danger produce signals by the momentary impingement of a stream of electrons on the target 47, the tube 42 being conditioned to produce the stream by the received pulse.

Signals from target 47, designating an object in the path of the vehicle, may be checked for the range of the object by measuring the object range in tube 61 in terms of the time interval between the transmission of a pulse and the reception of a reflected pulse from the object. This interval may be determined as the horizontal distance between the origin of the range sweep, and the position of a pip 71 capable of producing a signal by the impingement of electrons on target 66. The output from tube 61 may be applied to an alarm or to a motion corrective device adapted to so control the vehicle motion as to avoid the obstacle.

The tube 42 may be replaced by signal switch 75, which may condition the tube 61 whenever the nod angle is small. Commutators 84 and 85, in conjunction with either switch 75 or tube 42, provide combined determination of obstacles in the path of the vehicle and a minimum terrain clearance. By projecting the terrain clearance beam forwardly and downwardly at a predetermined angle, the apparatus measures the vertical distance from the course to the point of impingement of the beam with the terrain.

Fig. 2 illustrates a modified arrangement of the apparatus disclosed in Fig. 1, wherein certain of the parts have been simplified. Corresponding parts have been designated by similar reference characters. The operation of the transmitter T and its construction are identical with those disclosed in connection with Fig. 1. In Fig. 2 the viewing tube 24 has been eliminated together with its function, the tube 42 has been replaced by the overload relay 75 of the same general type disclosed as an optional structure in Fig. 1, and the range measuring tube 61 has been replaced by a gating device 92.

In the apparatus of Fig. 1 the receiver is gated or conditioned for the reception of signals immediately following transmission of each radiated pulse in response to a pulse from the generator 12. By accurately determining the duration of such conditioning pulse, and by controlling the time delay between the transmission of electromagnetic pulses and the application of the conditioning pulse, the range of distances over which object reflections may be detected by the receiver may be controlled without resort to the cathode ray device 61. Such a control of the receiver R may be effected by means of a phase shifter 93 actuated by the control oscillator 11, which phase shifter may include a control 96 for retarding and advancing the phase of an output signal relative to the input signal.

A pulse generator 94 is controlled by the output from phase shifter 93, and applies a signal such as a conditioning grid bias or screen voltage to one of the stages in the receiver R. Control 95 permits adjustment of the duration of the conditioning pulse, or the width of the electronic gate. Switching means 90 permits changing over from a variable to fixed receiver gate.

It will be apparent that the distance at which an obstacle becomes a hazard to a moving vehicle depends largely on the forward speed of the vehicle. Hence, it may be desirable to provide means for adjusting the minimum range of the device as a function of such vehicle speed. This arrangement is disclosed diagrammatically in Fig. 2, wherein a velocity meter 97, such as a speedometer, airspeed indicator, or the like, may be mechanically or electronically connected with the range determining means so as to increase the effective minimum range as the speed of the vehicle increases. As shown in Fig. 2, a simple connection 80 may be made between an indicating knob 98 of the meter 97 and control 96, or other control member operative to increase the range over which warning signals may be formed.

Figs. 3 and 4 disclose the manner in which the principles of the invention may be applied to the barometric and absolute altimetric control of aircraft flight. It is standard practice to regulate the plane's flight barometrically, as indicated in the previously-mentioned Carlson Patent No. 2,203,611. As diagrammatically illustrated in Fig. 4, an automatic pilot 58, having an elevation or other control 57, may be controlled so as to maintain the craft on a substantially level course C (Fig. 3) by deriving signals for the automatic pilot from a pressure responsive or barometric device 99. The device 99 ordinarily comprises a variable capacity chamber, such as an aneroid bellows 101, having a stem 102 axially movable in response to pressure changes. An armature 103, movable relative to an E-type core 104, may be controlled by the motion of stem 102.

The middle leg of the core 104 is provided with a primary winding 105 energized by a suitable source of alternating current. The remaining legs are provided with two secondary windings 106, series connected in phase opposition, and having their terminals connected to wires 107 and 108, extending to the automatic pilot 58 in series with contact 110 and armature 109 of a high impedance relay 111. The armature 103 normally is disposed symmetrically with respect to the three legs of the core 104, completing the magnetic path between the primary and secondary windings equally so that no voltage is applied to the automatic pilot. Movement of the stem 102, however, moves the armature 103 from the symmetrical position and provides greater flux concentration in one of the secondary windings than in the other, developing a voltage across wires 107 and 108 having amplitude and phase relations coordinated with the movement of the armature 103, and operative on the automatic pilot 58 to vary the craft position so as to restore the normal barometric condition. Stops 112, secured to the core 104 and disposed in the path of motion of the armature 103, restrain excessive movement of the armature and thereby moderate the degree of correction produced by the automatic pilot. The entire assembly may be adjusted relatively to the armature 103 as by a control knob 113 adjustable along a support 114. Excessive movement of the stem 102 may be absorbed by spring 115.

The apparatus of Fig. 4 thus far described is effective in maintaining an aircraft A on a generally horizontal course C but does not guard against the hazard occasioned by the advancing terrain rising to within dangerously close distances to the course C. Accordingly, as illustrated in Fig. 3, if the barometrical control is adjusted so that the course C is too low with respect to mountainous peaks P and P', or other ground projections, such that the hazard of collision becomes serious, no provision normally is made to avoid such collision if the peak or other obstacle is not visible to the pilot. By combining the minimum ground clearance device of Figs. 1 and 2 with the barometric control device of Fig. 4, this hazard is overcome.

Fig. 4 discloses an arrangement whereby the automatic pilot 58 may be controlled in response to ground clearance or minimum distance signals instead of barometric signals, when the occasion demands. An obstacle avoidance or ground clearance meter 116 comprises any conventional device capable of determining minimum spacing, specifically the vertical distance between the aircraft course and some point on the ground lying at a fixed distance ahead of the craft. The meter 116 preferably produces electrical energy indications of a predetermined minimum clearance. It is not essential that the determinations quantitatively measure the clearance distance, provided the meter is capable of producing some indication when a minimum clearance condition obtains. The ground clearance meter 116 may comprise the apparatus of Fig. 1, exclusive of the control and alarm devices actuated by the tube 61, or all portions of Fig. 1, up to and including amplifier 55.

If the meter 116 produces electrical pulses of the type passing through wire 74, it may be made to actuate a sensitive high-impedance relay 111, such as an electromagnetic relay, or a thermionic tube, such as a Thyratron. Operation of the relay 111 completes a circuit adapted to produce a fly-up or other corrective signal in the automatic pilot 58.

As shown in the drawing, such a device may comprise an automatic adjustor 117 comprising, for example, a solenoid actuated rack 118 and pinion 119, operative through a slip coupling 121 to alter the position of the elevation control 57, while permitting manual adjustment of the control 57 from the opposite side of the automatic pilot while the pinion 119 is held stationary.

A solenoid 122 is energized upon actuation of relay 111 and attracts a plunger 123 so as to move the rack 118 against the action of a spring 124, until a projection 125 abuts against stop 126. The projection 125 is adjustable along the plunger 123 to control the extent that the elevation control is moved when the solenoid 122 is energized.

The circuit to solenoid 122 is completed through normally closed thermostatic switch 127 and battery 128 when the actuation of relay 111 closes the circuit between armature 109 and a contact 129. Once the relay 111 is energized by signals from the meter 116, both the relay and solenoid 122 remain in an energized condition for a predetermined time interval by current flowing from battery 128 through the switch 127, solenoid 122, and contact 129. The sustained activation of the solenoid maintains the desired fly-up signal in the automatic pilot until the motion of the craft raises the cone of danger outside of the range of an ordinary object producing the initial reflection and operation of relay 111.

The desired time interval for the solenoid 122 may be obtained with the thermostatic switch 127, as by heating the bimetallic element 131 by means of a heating coil 132 in series with the solenoid 122. Thus, after a predetermined interval, adjustable by means of potentiometer 133, the bimetallic element 131 is heated to a point at which separation of contacts 134 and 135 occurs, at which time relay 111 becomes deenergized, and spring 136 restores armature 109 into engagement with contact 110, restoring the control of the automatic pilot to the barometric device 99. Meanwhile spring 124 lifts rack 118 to its initial position, restoring the elevation control 57 to its original position.

If at this time, the object extends above the course C, the relay 111 becomes immediately reenergized, and the cycle of operations is repeated. The net effect is to cause the aircraft to continue flying upwardly at a predetermined rate until the obstacle no longer constitutes a hazard, and, accordingly, fails to produce reflections that operate the system.

The sensitivity of the relay 111 may be adjusted by means of resistor 137 and capacitor 138, preferably arranged as indicated in Fig. 4, to provide a filter network or integrating circuit. The RC constants of the circuit can be adjusted so that the signal developed by a single fleeting object such as, for example, an airplane crossing the path of flight, will not actuate the system. However, the voltage across the capacitor 138 may be built up momentarily by repeated reflections from an object lying in the field to which the system is sensitive. The provision of the lock-in circuit, whereby the solenoid 122 is maintained energized for an interval following the actuation of relay 111, provides an additional safety factor and assures sufficient deviation of the vehicle from its course to fully avoid the obstacle.

The operation of the apparatus shown in Fig. 4 may be more fully understood by reference to Fig. 3. The aircraft A approaching peak P' projects an electromagnetic energy beam B forwardly and substantially axially of the craft to define a cone of danger. The minimum range device also is conditioned for operation by reflections from objects lying along the beam B when projected downwardly and forwardly, as indicated in Fig. 3, for determining minimum terrain clearance conditions.

At the position of craft A, indicated at the right of Fig. 3, peak P' causes actuation of the terrain clearance device or ground clearance meter 116, and the desired fly-up signal is produced so that the course is changed, as indicated by the rising dotted line above the peak P'. The hazardous ground clearance condition having been satisfied, control of the automatic pilot is restored to the barometric device 99 and the craft continues along its course C at the original elevation.

When the aircraft A approaches peak P, the beam B projecting forwardly within the cone of danger K intercepts the peak at the minimum distance before the ground clearance beam B. Signals from the meter 116 operate the relay in response to the reflections produced by the peak. Accordingly, the craft A is caused to fly upwardly over the peak P and will be restored to its original course in the manner indicated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of avoiding collision between a vehicle and an obstacle in the path of said vehicle, said method comprising radiating electromagnetic energy into the region of said obstacle, detecting reflections of electromagnetic energy from said obstacle, deriving signals from reflections received within a predetermined interval following radiation of such energy, varying said interval as a function of the speed of said vehicle, and controlling the motion of said vehicle in response to said signals so as to avoid said obstacle.

2. Obstacle detection and control apparatus comprising means for projecting a beam of electromagnetic energy intermittently in a zone forwardly of a vehicle proceeding along a desired course, means for sweeping said beam through progressively varying solid angles, means adapted to derive signals from reflections received from obstacles along said course only within a predetermined periodic interval following the intermittent projection of said energy, means for varying said interval as a function of the speed of said vehicle and vehicle-motion control means responsive to said signals for changing the motion of said vehicle.

3. An obstacle-detecting-and-avoiding apparatus for a vehicle, comprising a radiator of collimated electromagnetic energy, radiator-controlling means for periodically sweeping said collimated energy through progressively widening helical paths, means operative when said radiator passes through a predetermined angular position for deriving signals from reflections propagated by irradiated obstacles and steering means responsive to said signals for diverting said vehicle during a predetermined time interval from its path of travel.

4. A vehicle control system comprising means for radiating electromagnetic energy pulses forwardly along the path of travel, receiver means adapted to derive signals from energy reflected from obstacles along said path, gating means adapted to render said receiver means operative during only a brief interval following the radiation of each pulse, and means responsive to the speed of said vehicle for regulating said gating means, thereby to vary the time increment between the radiation of each pulse and the beginning of each corresponding interval as a function of said vehicle speed.

5. In a radio system for obstacle avoidance, apparatus adapted to be mounted on a craft comprising transmitting means for generating and directively radiating radio energy in pulses, scanning means for sweeping said pulses over a field of view extending forwardly of said craft, receiving means for detecting reflections of said pulses from obstacles in said field of view, indicating means for oscillographically indicating said reflecting obstacles, selecting means responsive to said receiving and scanning means for deriving craft motion-corrective signals only during a predetermined interval after radiation of each of said pulses from only a predetermined portion of said field of view, and craft motion-corrective means responsive to said signals.

6. In a radio system for obstacle avoidance, apparatus adapted to be mounted on a craft comprising transmitting means for generating and directively radiating radio energy in pulses, scanning means for sweeping said pulses over a field of view extending forwardly of said craft, receiving means for detecting reflections of said pulses from obstacles in said field of view, indicating means for oscillographically indicating said reflecting obstacles, selecting means responsive to said receiving means only for a predetermined interval after radiation of each of said pulses for deriving craft motion-corrective signals and craft motion-corrective means responsive to said signals.

7. In a radio system for obstacle avoidance, apparatus adapted to be mounted on a craft comprising transmitting means for generating and directively radiating radio energy in pulses, scanning means for sweeping said pulses over a field of view extending forwardly of said craft, receiving means for detecting reflections of said pulses from obstacles in said field of view, indicating means for oscillographically indicating said reflecting obstacles, selecting means responsive to said scanning means over only a portion of said field of view for deriving craft motion-corrective signals and craft motion-corrective means responsive to said signals.

8. Apparatus for controlling the possibility of collision between a moving vehicle and an obstacle in the path of said vehicle comprising means for radiating electromagnetic energy in the direction of travel of said vehicle, means for detecting reflections of electromagnetic energy from said obstacle, means for deriving signals from only those detected reflections received within a predetermined range interval following radiation of such energy, means for varying said interval as a function of the speed of said vehicle and means for controlling the motion of said vehicle in response to said signals.

9. Apparatus for avoiding collision between an aircraft and an obstacle in the path of flight of said aircraft comprising means for radiating pulses of electromagnetic energy in a zone lying forwardly along said path, means deriving signals from reflections received within a generally conical figure of revolution lying in said zone, and means for temporarily diverting said aircraft upwardly in response to said signals.

10. Apparatus for avoiding collision between an aircraft and an obstacle in the path of said aircraft comprising means for radiating pulses of electromagnetic energy in a zone lying forwardly along said path, means for deriving signals from reflections received within a generally conical figure of revolution lying in said zone only during a predetermined interval following the radiation of each of said pulses, and means for diverting said aircraft from said path in response to said derived signals.

11. In an obstacle detection system wherein obstacles lying in different portions of a zone extending forwardly of a moving craft are irradiated successively by a beam of electromagnetic energy emanating from said craft and wherein representations thereof are formed oscillographically at said craft in response to energy reflected from said obstacles, obstacle avoidance apparatus comprising receiving means for deriving signals from energy reflected from said different portions of said zone, attitude control means for normally maintaining said craft in a predetermined attitude, and means for periodically causing said control means to respond to said signals whenever reflected energy is received from a predetermined one of said zone portions to divert said craft from its path of travel.

WALDEMAR A. AYRES.

REFERENCES CITED

The following references are of record in the file of this patent:

UNITED STATES PATENTS

| Number | Name | Date |
|---|---|---|
| 1,625,252 | Hammond | Apr. 19, 1927 |
| 1,794,690 | Horni | Mar. 3, 1931 |
| 1,923,430 | Fanning | Aug. 22, 1933 |
| 1,997,412 | Fischel | Apr. 9, 1935 |
| 2,057,773 | Finch | Oct. 20, 1936 |
| 2,083,242 | Runge | June 8, 1937 |
| 2,158,584 | Koster | May 16, 1939 |
| 2,176,469 | Moueix | Oct. 17, 1939 |
| 2,216,575 | Seinfeld et al. | Oct. 1, 1940 |
| 2,225,046 | Hunter | Dec. 17, 1940 |
| 2,231,929 | Lyman | Feb. 18, 1941 |
| 2,247,662 | Newhause | July 1, 1941 |
| 2,305,485 | Merriam | Dec. 15, 1942 |